(12) United States Patent
Blomstrand et al.

(10) Patent No.: US 11,443,635 B2
(45) Date of Patent: Sep. 13, 2022

(54) METHOD FOR TRANSFORMING BETWEEN A LONG VEHICLE COMBINATION AND A PLATOON ON THE MOVE

(71) Applicant: VOLVO TRUCK CORPORATION, Gothenburg (SE)

(72) Inventors: Jesper Blomstrand, Härryda (SE); Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 462 days.

(21) Appl. No.: 16/485,259

(22) PCT Filed: Mar. 6, 2017

(86) PCT No.: PCT/EP2017/055175
§ 371 (c)(1),
(2) Date: Aug. 12, 2019

(87) PCT Pub. No.: WO2018/162030
PCT Pub. Date: Sep. 13, 2018

(65) Prior Publication Data
US 2019/0385461 A1    Dec. 19, 2019

(51) Int. Cl.
| | |
|---|---|
| *G08G 1/00* | (2006.01) |
| *B60D 1/44* | (2006.01) |
| *B60D 1/46* | (2006.01) |
| *G05D 1/00* | (2006.01) |
| *G05D 1/02* | (2020.01) |

(Continued)

(52) U.S. Cl.
CPC .................. *G08G 1/22* (2013.01); *B60D 1/44* (2013.01); *B60D 1/46* (2013.01); *B60D 1/481* (2013.01); *B62D 53/0864* (2013.01); *G05D 1/0011* (2013.01); *G05D 1/0293* (2013.01);
(Continued)

(58) Field of Classification Search
CPC ... G08G 1/22; B60D 1/44; B60D 1/46; B60D 1/36; B60D 1/481; G05D 1/0293; B62D 53/0864; B62D 53/00; B60Y 2200/148; B60Y 2200/1422
See application file for complete search history.

(56) References Cited

U.S. PATENT DOCUMENTS

| | | | |
|---|---|---|---|
| 2010/0044998 A1 | 2/2010 | Franchineau | |
| 2010/0082179 A1* | 4/2010 | Kronenberg | B62D 35/001 701/1 |

(Continued)

FOREIGN PATENT DOCUMENTS

| | | |
|---|---|---|
| CN | 101248469 A | 8/2008 |
| JP | 5335404 B2 * | 11/2013 |

(Continued)

OTHER PUBLICATIONS

Japan Office Action dated Mar. 23, 2021 in corresponding Japan Patent Application No. 2019-543985, 6 pages.

(Continued)

*Primary Examiner* — Alan D Hutchinson
*Assistant Examiner* — Andy Schneider
(74) *Attorney, Agent, or Firm* — Venable LLP; Jeffri A. Kaminski

(57) ABSTRACT

The invention relates to a method for transforming between a long vehicle combination (10) and a platoon (12) on the move. The present invention also relates to vehicles (14*a-b;* 14*b-c*) for such a method.

21 Claims, 6 Drawing Sheets

(51) Int. Cl.
*B60D 1/48* (2006.01)
*B60D 1/36* (2006.01)
*B62D 53/08* (2006.01)

(52) U.S. Cl.
CPC .......... *B60D 1/36* (2013.01); *B60Y 2200/148* (2013.01); *G05D 2201/0213* (2013.01)

(56) References Cited

U.S. PATENT DOCUMENTS

| | | | |
|---|---|---|---|
| 2010/0256852 A1* | 10/2010 | Mudalige | ................ G08G 1/22 |
| | | | 701/24 |
| 2011/0101646 A1 | 5/2011 | Sakita | |
| 2011/0270520 A1 | 11/2011 | Kronenberg | |
| 2016/0144906 A1 | 5/2016 | Han et al. | |

FOREIGN PATENT DOCUMENTS

| | | | |
|---|---|---|---|
| JP | 2015081017 A | 4/2015 | |
| JP | 2017502866 A | 1/2017 | |
| WO | 2014185828 A1 | 11/2014 | |

OTHER PUBLICATIONS

International Search Report and Written Opinion dated Jan. 22, 2018 in International Application No. PCT/EP2017/055175.

* cited by examiner

METHOD FOR TRANSFORMING BETWEEN A LONG VEHICLE COMBINATION AND A PLATOON ON THE MOVE

TECHNICAL FIELD

The invention relates to a method for transforming between a long vehicle combination and a platoon on the move. The invention also relates to vehicles for such a method. The invention can be applied in heavy-duty vehicles, such as trucks.

BACKGROUND

Automotive industry, research industry and others have explored possibilities to drive road vehicles in so called 'platoons' with small time gaps mainly in order to save fuel but also to decrease driver workload and road footprint. The small time gap is enabled by vehicle-to-vehicle (V2V) communication and automation of longitudinal control. The level of both longitudinal and lateral control can differ between different platooning concepts and road environments.

Another concept is long vehicle combinations, wherein several vehicles are mechanically coupled together one after the other. A long vehicle combination may have a benefit from a personnel perspective, e.g. one driver driving two or three full 40 ft. containers, which reduces driver costs. From an aerodynamic perspective the closer the vehicles can be driven, the less air drag is generated, and the fuel costs can be reduced.

US2011/0270520 (Kronenberg) discloses methods for linking two or more vehicles to achieve reduced aerodynamic drag while the vehicles are travelling on the road. US2011/0270520 discloses that the linking system may connect and disconnect the vehicles while they are in motion. The linkage between leading and trailing vehicles may be disconnected by either driver as desired, especially when the operating conditions require individual manipulation of the vehicles such as in tight corners and weight stations. Furthermore, the linking system may include a programmable adaptive cruise control system to bring the vehicles to be linked to close proximity and alignment with each other before the activation of an arm positioned on the trailing vehicle. Furthermore, a power source operatively associated with the arm may be automatically controlled by an automatic alignment system comprising an RF signal generator attached to or embedded in a passive member on the leading vehicle, and an RF signal receiver and a microprocessor operatively connected to the power source and attached to or embedded in an active member which includes the arm. However, it may be difficult using adaptive cruise control—which typically rely on a front facing radar on the trailing vehicle—to get the vehicles close enough for connection, unless the conditions are ideal, like a long and straight road without uphill or downhill slopes and no traffic in front of the leading vehicle that suddenly brakes.

SUMMARY

An object of the invention is to provide an improved, accurate and/or robust method and vehicles for automatic mechanical coupling/decoupling in relation to a long vehicle combination.

According to a first aspect of the invention, the object is achieved by a method according to claim 1. According to a second aspect of the invention, the object is achieved by a vehicle according to claim 20. According to a third aspect of the invention, the object is achieved by a vehicle according to claim 21.

According to the first aspect of the invention, there is provided a method for transforming between a long vehicle combination and a platoon on the move, wherein the long vehicle combination comprises a plurality of vehicles mechanically coupled together one after the other, which method comprises the steps of: detecting that the long vehicle combination is approaching a first road section ahead, which first road section stipulates decoupling the vehicles of the long vehicle combination to form the platoon; automatically decoupling the vehicles from each other while the vehicles are in motion to form the platoon before reaching the first road section; the platoon driving through the first road section; detecting a second road section which stipulates coupling together the vehicles of the platoon to form the long vehicle combination; a vehicle in the platoon immediately ahead of a following vehicle of said the platoon sending information to the following vehicle via wireless vehicle-to-vehicle communication, which information indicates the position and speed of a rear automatic coupling device of the vehicle immediately ahead; based at least on the position and speed in the sent information, autonomously driving the following vehicle so that the rear automatic coupling device of the vehicle immediately ahead of the following vehicle gets within an operational range of a front coupling element of the following vehicle; while in motion and when the rear automatic coupling device is within the operational range, the following vehicle automatically adjusting a front coupling device including said front coupling element so that the position of the front coupling element matches the position of the rear automatic coupling device as indicated in the sent information; and automatically coupling together the following vehicle and the vehicle immediately ahead while the vehicles are in motion to form at least a part of the long vehicle combination.

Part of the invention is based on the understanding that by means of the information sent to the following vehicle via wireless vehicle-to-vehicle communication, the following vehicle can closely approach the vehicle immediately ahead before automatic coupling, even under non-ideal road conditions. Furthermore, by sending the position of the rear automatic coupling device from the vehicle immediately ahead to the following vehicle, the following vehicle may readily adjust its front coupling device so that automatic coupling can be performed while in motion. Furthermore, by transforming to/from a platoon, the following vehicles may automatically follow the leading vehicle also when not coupled together as the long vehicle combination.

Each following vehicle may comprise actuator means adapted to adjust the front coupling device. The actuator means may for example comprises at least one hydraulic cylinder or similar connected between the front coupling device and the following vehicle's chassis. The front coupling device may for example be a drawbar, and the front coupling element may for example be a drawbar eye.

The actuator means may be adapted to laterally adjust the front coupling device.

The actuator means may (also) be adapted to vertically adjust the front coupling device. Alternatively, the vertical position or height of the front coupling element may be adjusted by means of the following vehicle's air suspension.

Each following vehicle may comprise means adapted to adjust the length of the front coupling device. The front coupling device may for example be telescopic, and the means adapted to adjust the length of the front coupling device may for example be pneumatic or include a gear wheel and gear rack.

The minimum and maximum adjustment (lateral, vertical, length) of the front coupling device may give the aforementioned operational range of the front coupling element.

The method may further comprise the step of: shortening the length of the front coupling device while driving as the long vehicle combination, to further reduce the aerodynamic drag.

Each following vehicle may be adapted to estimate the position of its front coupling element based on the heading of the following vehicle, the position of a part of the following vehicle as determined by a navigation system of the following vehicle, a vehicle model representing the following vehicle, a first angle representing a lateral adjustment of the front coupling device, a second angle representing any vertical adjustment of the front coupling device, the length of the front coupling device, and a height related to the front coupling device. The heading of the following vehicle may be determined by the navigation system. The navigation system may for example be a GPS (Global Positioning System) navigation system. Such a system is typically readily available in the following vehicle. The vehicle model may be a linear vehicle model in which a coupling position related to the front coupling device is defined. Linear vehicle models are known per se, see for example WO 2014/185828 A1, the content of which herein is incorporated by reference. The first angle may be the angle between the front coupling device and the heading of the following vehicle. The second angle may be the angle between the front coupling device and the road surface. The first and second angles may for example be determined using one or more sensors or based on the state of the aforementioned actuator means. The height of the front coupling device may for example be the height of front coupling element, in case the front coupling device is not vertically adjustable, wherein the height may be estimated based on input from a height level sensor of the following vehicle and a predetermined offset between the height level sensor and the front coupling element. Alternatively, in case the front coupling device is vertically adjustable, the height of the front coupling device may be the height of a point where the front coupling device is connected on the following vehicle's chassis, which height may be estimated based on input from a height level sensor of the following vehicle and a predetermined offset between the height level sensor and this point.

Based on the above, the position of the front coupling element may be calculated using trigonometry.

Similarly, each vehicle immediately ahead may be adapted to estimate the position of its rear automatic coupling device based on the heading of the vehicle immediately ahead, the position of a part of the vehicle immediately ahead as determined by a navigation system of the vehicle immediately ahead, a vehicle model representing the vehicle immediately ahead, the height of the rear automatic coupling device, and in case the vehicle immediately ahead is an articulated vehicle, at least one articulation angle of the vehicle immediately ahead as detected by at least one articulation angle detection means on the vehicle immediately ahead.

Each vehicle immediately ahead may comprise at least two independent means for determining its speed. In this way, even if one of the systems fails, the following vehicle may receive the correct speed allowing it to safely drive so that the rear automatic coupling device of the vehicle immediately ahead gets within the aforementioned operational range. The at least two independent means may be selected from the group comprising: an active speed sensor in transmission, a navigation system, and one or more wheel speed sensors.

The method may further comprise the step of: a leading vehicle of the platoon sending an acceleration or deceleration request to the following vehicles of the platoon via wireless vehicle-to-vehicle communication. The acceleration or deceleration request sent via wireless vehicle-to-vehicle communication may allow a following vehicle to safely drive within the aforementioned operational range, even if the operational range results in a relatively short headway between the following vehicle and the vehicle immediately ahead and even if the speed is relatively high.

The information sent from the vehicle immediately ahead to the following vehicle may include the heading of the rear automatic coupling device of the vehicle immediately ahead. This heading gives the following vehicle the possibility to judge if the heading is within the operational range of the front coupling element. If not, the road curvature may be too large for automatic coupling at that moment and speed, or the vehicle immediately ahead is not well positioned on the lane for automatic coupling in speed.

The first road section may be at least one of a bridge, a roundabout, and a turn. Bridges may have weight limitations. By transforming the long vehicle combination to a platoon before the bridge, in which platoon inter-vehicle distances may be longer than in the long vehicle combination, the vehicles may pass the bridge without exceeding the weight limitation. After the bridge, the long vehicle combination can be automatically re-formed in motion, to improve fuel efficiency. Likewise, roundabouts or turns typically have width limitations. By transforming the long vehicle combination to a platoon before the roundabout or turn, which platoon may have a swept path width when turning which is less wide than the swept path width of the long vehicle combination, the vehicles may properly pass the roundabout or turn. After the roundabout or turn, the long vehicle combination can be automatically re-formed in motion, to improve fuel efficiency.

The method may further comprise the step of planning an inter-vehicle distance between subsequent vehicles based on the first road section ahead, wherein the platoon is driven through the first road section with the planned inter-vehicle distance(s). In case the first road section ahead is a bridge, the inter-vehicle distance may for example depend on the aforementioned weight limitation. In case the first road section ahead is a roundabout or sharp turn, the inter-vehicle distance may for example depend on the aforementioned width limitation.

At least one of the automatic decoupling and the automatic coupling may be performed while driving at a safety speed. The safety speed may be related to e.g. current road condition, wherein poor road condition may put the safety speed close to zero speed, whereas smooth road condition without curvature and hills may lead to higher safety speed. The safety speed may alternatively or complementary depend on the performance of the vehicles. For example, the lowest acceleration/deceleration capability among the vehicles may determine the safety speed. The safety speed may ensure that the adjustment of the front coupling device is able to move as fast as expected disturbances. The safety speed may for example be in the range of 10-30 km/h, 30-50 km/h, or 50-70 km/h.

The automatic coupling may be performed while driving on a straight road, to facilitate the automatic coupling.

The automatic coupling may start with the vehicle immediately behind the leading vehicle of the platoon coupling to the leading vehicle of the platoon. Then the next vehicle may couple to the vehicle immediately behind the leading vehicle, and so on. In this way, only one vehicle needs to change its relative speed during coupling, and that vehicle does not have to pull other vehicles when approaching the vehicle immediately ahead.

Similarly, the automatic decoupling may start with the last vehicle of the long vehicle combination decoupling from the vehicle immediately ahead. Then the penultimate vehicle may be decoupled, and so on.

Each vehicle after the leading vehicle of the long vehicle combination or platoon may be an autonomous vehicle. 'Autonomous' means that the vehicle is driverless, i.e. it may drive without human input. At least one vehicle after the leading vehicle of the long vehicle combination or platoon may for example an autonomous dolly and semi-trailer combination. The autonomous dolly may be an electric vehicle comprising an electric motor for propulsion, a power source (battery) for the electric motor, a trailer coupling device, steering capability, braking capability, but no cab.

According to the second aspect of the invention, there is provided a vehicle comprising: a rear automatic coupling device; a control unit adapted to estimate the position of the rear automatic coupling device while the vehicle is in motion; and communication means adapted to wirelessly send information indicating the estimated position and the speed of the rear automatic coupling device to a following vehicle. This aspect may exhibit the same or similar features and/or technical effects as the first aspect of the invention, and vice versa.

According to the third aspect of the invention, there is provided a vehicle comprising: a front coupling device including a front coupling element; a control unit adapted to estimate the position of the front coupling element while the vehicle is in motion; communication means adapted to wirelessly receive information from a vehicle immediately ahead, which information indicates the position and speed of a rear automatic coupling device of the vehicle immediately ahead; autonomous driving means adapted to drive the vehicle based at least on the position and speed in the received information so that the rear automatic coupling device of the vehicle immediately ahead gets within an operational range of the front coupling element; and means adapted to automatically adjust the front coupling device, while in motion and when the rear automatic coupling device is within the operational range, so that the position of the front coupling element matches the position of the rear automatic coupling device as indicated in the received information. This aspect may exhibit the same or similar features and/or technical effects as the first and/or second aspect of the invention, and vice versa.

It should be noted that the vehicles of the second and third aspects may be interrelated: the vehicle of claim 20 may be a vehicle immediately ahead in the long vehicle combination or platoon, whereas the vehicle of claim 21 may be a following vehicle in vehicle the long vehicle combination or platoon.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
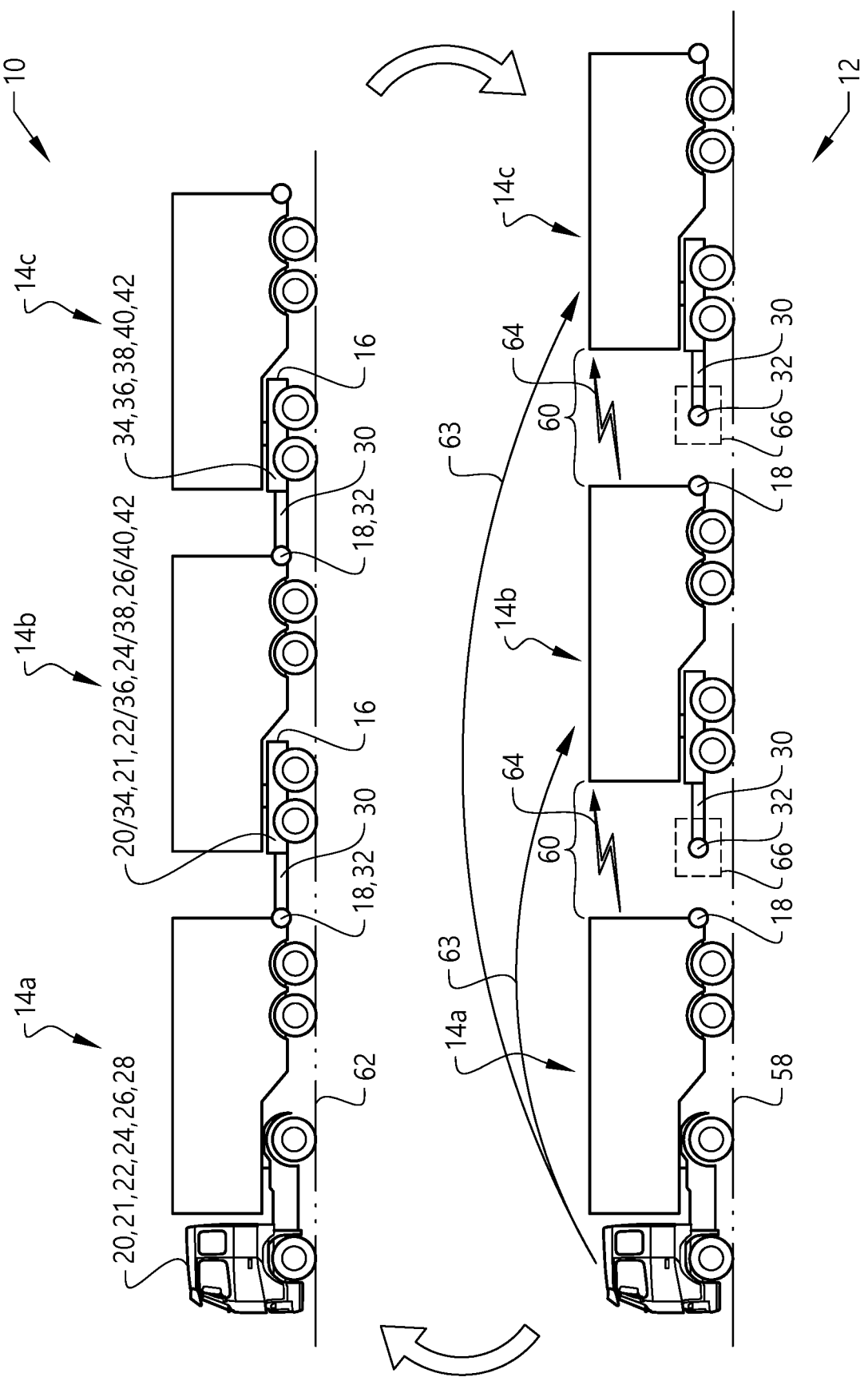
FIG. 1 is a schematic side view of a long vehicle combination and a platoon according to an embodiment of the present invention.

FIG. 1 is a schematic side view of a long vehicle combination 10 and a platoon 12 according to an embodiment of the present invention. In FIG. 1, the long vehicle combination 10 and platoon 12 comprises three vehicles 14*a-c*, but the number of vehicles could generally be two or more. The vehicles 14*a-c* include a leading vehicle 14*a* and two following vehicles 14*b-c*. Vehicle 14*c* is the last vehicle. Each vehicle 14*a-b* may also be referred to as a vehicle 'immediately ahead' (of vehicle 14*b* and 14*c*, respectively). It is appreciated that the middle vehicle 14*b* is both a 'following vehicle' (with respect to the leading vehicle 14*a*) and a 'vehicle immediately ahead' (with respect to the last vehicle 14*c*).

The illustrated leading vehicle 14*a* is a tractor and semi-trailer combination, but it could alternatively be a truck, etc. The leading vehicle 14*a* may be at least partly manually driven by a driver (not shown). Alternatively, the leading vehicle 14*a* may be an autonomous vehicle.

Each illustrated following vehicle 14*b-c* is an autonomous (driverless, self-driving) dolly and semi-trailer combination. The autonomous dolly is designated by reference sign 16. The autonomous dolly 16 may be an electric vehicle comprising an electric motor for propulsion, a power source (battery) for the electric motor, a trailer coupling device (e.g. including a fifth wheel for coupling to the semi-trailer), steering capability, and braking capability. The autonomous dolly 16 does not have any cab.

Each vehicle immediately ahead 14*a-b* comprises a rear automatic coupling device 18, a control unit 20, means 21 for speed determination (e.g. including an active speed sensor in transmission or at least one wheel speed sensor), a navigation system 22 (for example GPS), a height level sensor 24, and communication means 26. In case the vehicle immediately ahead 14*a-b* is an articulated vehicle, like the aforementioned tractor and semi-trailer combination or the autonomous dolly and semi-trailer combination, it may also comprise an articulation angle detection means 28, for example an articulation angle sensor. Automatic trailer couplings are available per se, for example VBG MFC (Multi Function Coupling) from VBG.

Each following vehicle 14*b-c* comprises a front coupling device 30 including a front coupling element 32, a control unit 34, a navigation system 36 (for example GPS), a height level sensor 38, communication means 40, and autonomous driving means 42.

Figure 2A:
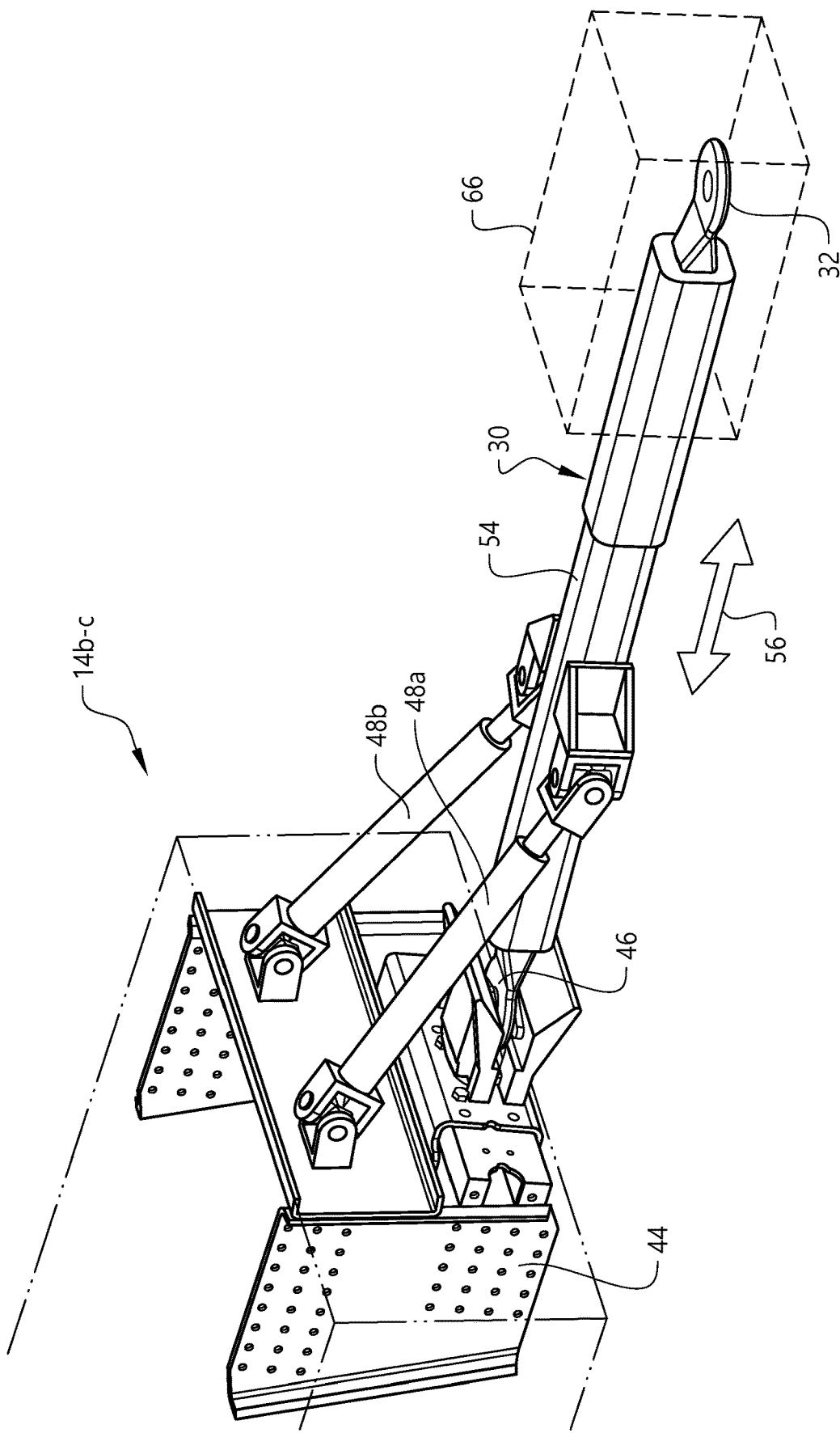
FIGS. 2*a-c* illustrate a front coupling device of a vehicle of the long vehicle combination/platoon of FIG. 1.
Figure 2B:
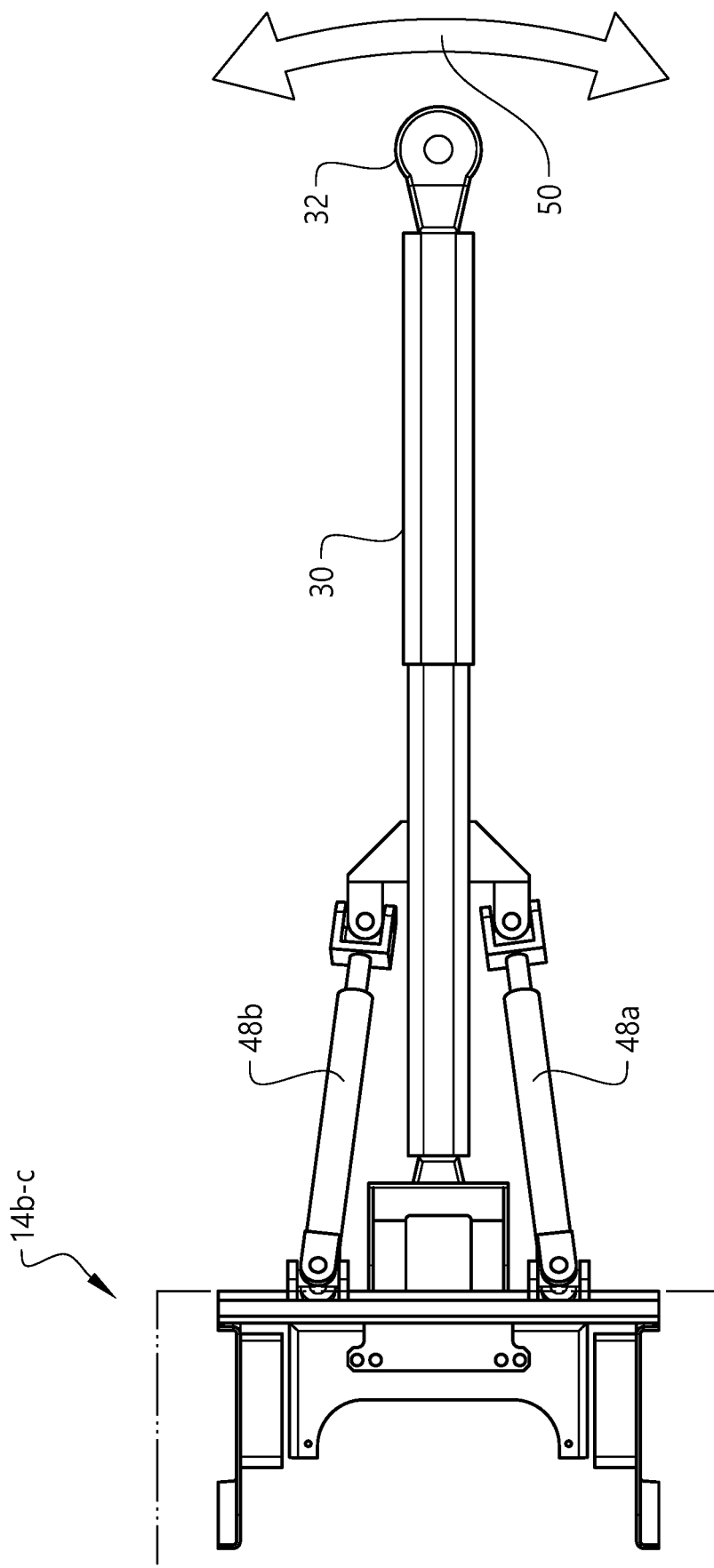
Figure 2C:
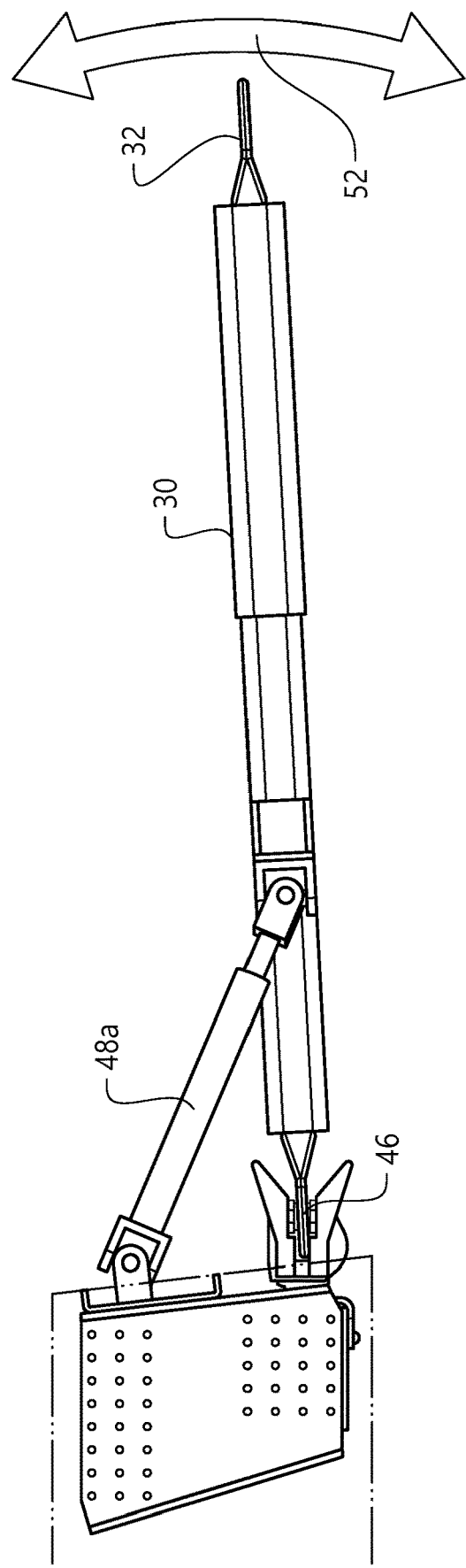

The front coupling device 30 is shown in more detail in FIGS. 2*a-c*. The front coupling device 30 is here a drawbar, and the front coupling element 32 is a drawbar eyelet fixedly arranged at one end of the drawbar 30. The opposite end of the drawbar 30 may be connected to the chassis 44 of the following vehicle 14*b-c* at point 46. The point 46 may be a joint. The following vehicle 14*b-c* further comprises actuator means adapted to adjust the drawbar 30. The actuator means here comprises two hydraulic cylinders 48*a-b* arranged in V-formation and connected between the drawbar 30 and the chassis 44. By means of the actuator means 48$a$-$b$, the drawbar 30 may be laterally and vertically adjusted, as illustrated by arrows 50 and 52, respectively. The lateral adjustment α may for example be −30 to 30 degrees, whereas the vertical adjustment β for example may be −5 to 30 degrees. The following vehicle 14$b$-$c$ further comprises means 54 adapted to adjust the length of the drawbar 30, as illustrated by arrow 56. The adjustable length L of the drawbar 30 may for example be 0.6 m to 1.2 m. The drawbar 30 may for example be telescopic, and the means 54 may include a gear wheel and gear rack. The means 54 may for example be arranged inside the drawbar 30, or outside the drawbar. Instead of a telescopic drawbar, the front coupling device 30 could be retractable relative to the chassis 44 of the following vehicle 14$b$-$c$. The minimum and maximum values of the lateral adjustment α, the vertical adjustment β, and the adjustable length L give an operational range (volume) 66 of the front coupling element 32.

Figure 3:
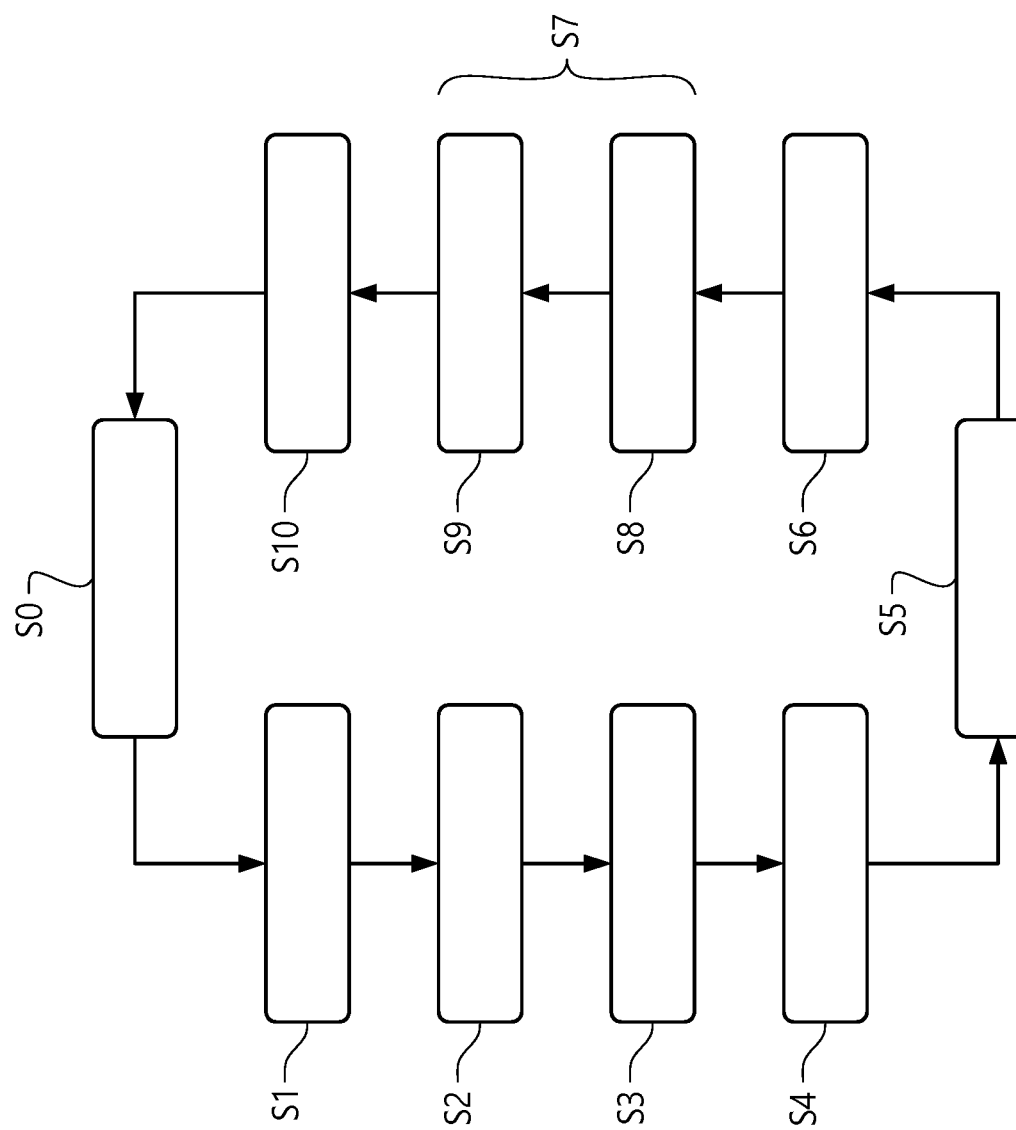
FIG. 3 is a flow chart of a method according an embodiment of the present invention.

With further reference to FIG. 3, the vehicles 14$a$-$c$ may initially drive as the long vehicle combination 10 (step S0), wherein the vehicles 14$a$-$c$ are mechanically coupled together one after the other. When driving as the long vehicle combination 10, the leading vehicle 14$a$ may be master whereas the following vehicles 14$b$-$c$ are slaves, meaning that the leading vehicle 14$a$ may control at least some functions of the following vehicles 14$b$-$c$.

While driving as the long vehicle combination 10, the length of the front coupling device 30 may optionally be shortened (step S1) compared to an initial length, whereby inter-vehicles distance in the long vehicle combination 10 are reduced, to reduce the aerodynamic drag and optimise for high speed. The length of the front coupling device 30 may for example be shortened 0.5 m-1 m.

In step S2, it is detected that the long vehicle combination 10 is approaching a first road section 58 ahead, which first road section 58 stipulates mechanically decoupling the vehicles 14$a$-$c$ of the long vehicle combination 10 to form the platoon 12. The first road section 58 may for example be a bridge, a roundabout, or a sharp turn. The bridge may have a weight limitation, and the roundabout or sharp turn may have a width limitation. Either limitation can make it inappropriate to drive through the first road section 58 as the long vehicle combination 10. The long vehicle combination 10 can for example receive information about the first road section 58 ahead by means of wireless vehicle-to-infrastructure (V2I) communication using the communication means 26 of for example the leading vehicle 14$a$. Alternatively, the information may be retrieved from the navigation system 22 of for example the leading vehicle 14$a$. The information may include the aforementioned weight or width limitation.

Inter-vehicle distances 60 between subsequent vehicles 14$a$-$b$; 14$b$-$c$ may be planned in step S3 based on the first road section 58 ahead. The inter-vehicle distances 60 may for example depend on the aforementioned weight or width limitation. The Inter-vehicle distances 60 may be planned by means of the control unit 20 of for example the leading vehicle 14$a$. The long vehicle combination 10 may also be brought to a safety speed.

Then, in step S4, the vehicles 14$a$-$c$ are automatically and mechanically decoupled from each other while the vehicles 14$a$-$c$ are in motion to form the platoon 12 before reaching the first road section 58. The automatic decoupling preferably starts with the last vehicle 14$c$ of the long vehicle combination 10 decoupling from the penultimate vehicle 14$b$, after which the vehicle 14$b$ is decoupled from the leading vehicle 14$a$. As each following vehicle 14$b$-$c$ is decoupled, it switches from slave to master. The automatic decoupling may be performed while driving at the safety speed.

Thereafter, the platoon 12 drives through the first road section 58 in step S5, preferably with the planned inter-vehicle distances 60.

In step S6, a second road section 62 which stipulates coupling together the vehicles 14$a$-$c$ of the platoon 12 to (re-)form the long vehicle combination 10 is detected. The second road section 62 may for example be a straight road or a road without sharp turns, like a highway, or a downhill in which the tonnage of the long vehicle combination 10 may be beneficial in order to recover energy from braking. The platoon 12 can for example receive information about the second road section 62 by means of wireless vehicle-2-infrastructure (V2I) communication using the communication means 26 of for example the leading vehicle 14$a$. Alternatively, the information may be retrieved from the navigation system 22 of for example the leading vehicle 14$a$. The platoon 12, for example, the leading vehicle 14$a$, may predict that (re-)forming the long vehicle combination 10 is appropriate by forward simulation, e.g. 1-5 km ahead.

In step S7, a vehicle 14$a$-$b$ immediately ahead sends information 64 to a following vehicle 14$b$-$c$ via wireless vehicle-to-vehicle communication. The information 64 may for example be sent using the communication means 26, and the information 64 may be received in the following vehicle 14$b$-$c$ using the communication means 40. The information 64 indicates or includes the position and speed of the rear automatic coupling device 18 of the vehicle 14$a$-$b$ immediately ahead. The speed of the rear automatic coupling device 18, which speed is equal to the speed of the vehicle 14$a$-$b$ immediately ahead, may be provided by the means 21 and the navigation system 22, for increased safety. The position may be estimated as described herein below.

Based (at least) on the position and speed in the sent information 64, the following 35 vehicle 14$b$-$c$ is autonomously driven (step S8) by means of the autonomous driving means 42, so that the rear automatic coupling device 18 of the vehicle 14$a$-$b$ immediately ahead gets within the operational range 66 of the front coupling element 32 of the following vehicle 14$b$-$c$. The operational range 66 is moving in that it in absolute terms moves along with the driving vehicle 14$b$-$c$.

As to speed, the following vehicle 14$b$-$c$ typically first increases its speed to get closer to the vehicle 14$a$-$b$ immediately ahead. The speed may then be gradually reduced, so that it finally matches the indicated speed of the rear automatic coupling device 18 of the vehicle 14$a$-$b$ immediately ahead, when the rear automatic coupling device 18 is within the operational range 66.

As to position, the following vehicle 14$b$-$c$ is driven such that the indicated position of the rear automatic coupling device 18 of the vehicle 14$a$-$b$ immediately ahead is within (the volume of) the operational range 66 of the front coupling element 32.

The leading vehicle 14$a$ may also send an acceleration or deceleration request 63 to the following vehicles 14$b$-$c$ via wireless vehicle-to-vehicle communication, using the communications means 26, 40. The acceleration or deceleration request 63 may allow the following vehicle 14$b$-$c$ to safely drive within the operational range 66, even if the operational range 66 results in a relatively short headway (inter-vehicle distance 60) and even if the speed is relatively high. For example, an operational range 66 of 0.6 m and a vehicle speed of 20 m/s may result in a maximum allowed communication delay of 0.6/20=30 ms, whereas the actual communication delay for V2V communication may be just 10-20 ms. Hence, the communication delay of the V2V communication is so short that safe emergency braking can be assured within the operational range 66. The V2V communication may for example be based on WLAN, such as the IEEE802.11 p standard. Furthermore, each following vehicle 14b-c may send data regarding its performance to the leading vehicle 14a, wherein the acceleration or deceleration request 63 may be adapted accordingly. The performance may for example be maximum and minimum capabilities in acceleration, jerk, speed etc., and it may be used by the leading vehicle 14a to set what maximum and minimum acceleration or deceleration requests 63 that can be sent.

While the following vehicle 14b-c is in motion and when the rear automatic 30 coupling device 18 is within the operational range 66, the following vehicle 14b-c automatically adjusts (step S9) its front coupling device 30 so that the position of the front coupling element 32 matches the position of the rear automatic coupling device 18 of the vehicle 14a-b immediately ahead, wherein the latter position is indicated in the information 64. The position is preferably three-dimensional (e.g. the position may be described by three coordinates X, Y, Z in a coordinate system). The position may be moving, meaning that it in absolute terms moves along with the driving vehicles 14a-c.

Figure 4:
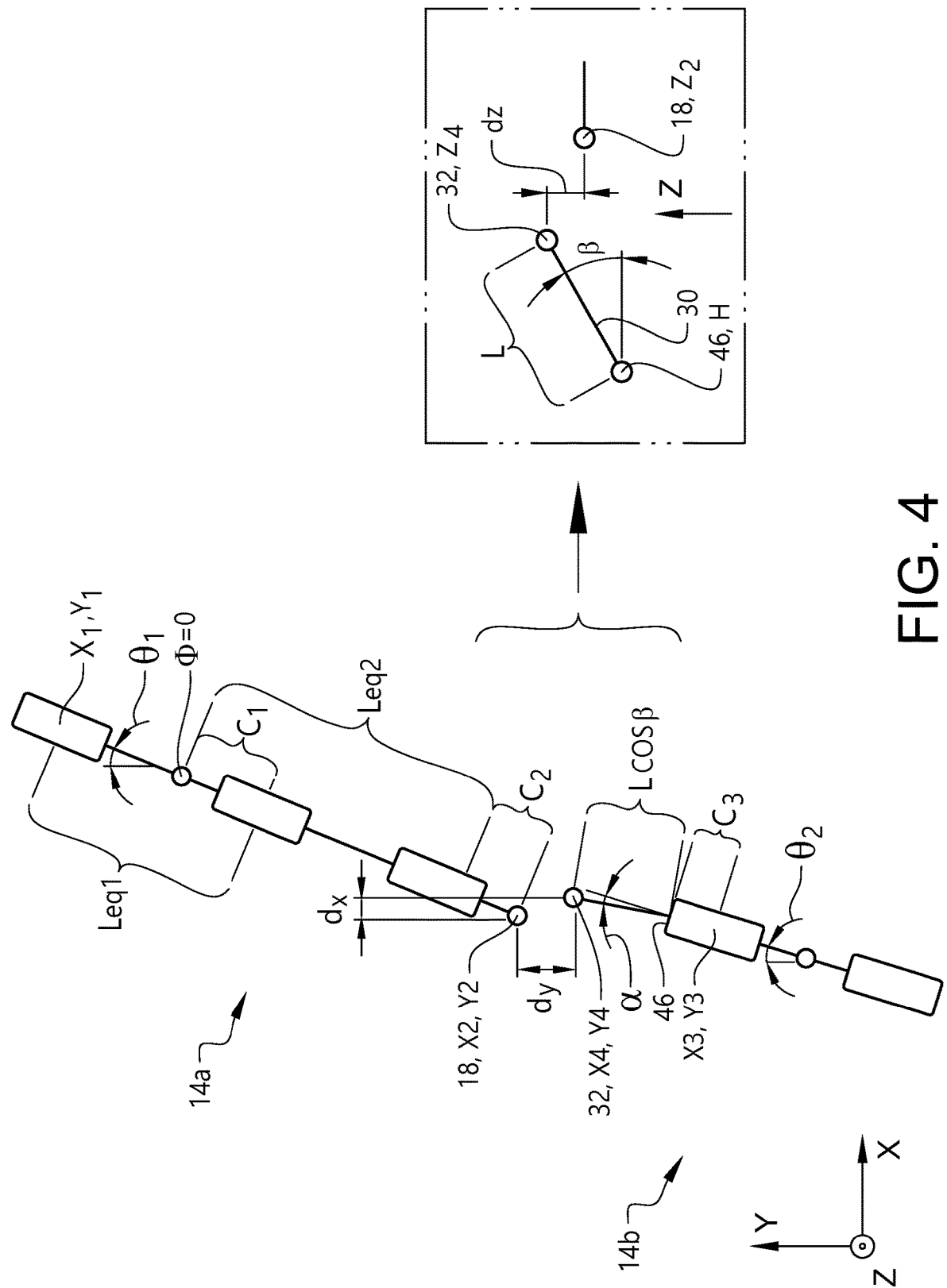
FIG. 4 illustrates linear vehicle models of two vehicles of the platoon of FIG. 1.

With further reference to FIG. 4, each vehicle 14a-b immediately ahead may estimate the position $X_2, Y_2, Z_2$ of its rear automatic coupling device 18 based on the heading $\theta_1$ of the vehicle 14a-b immediately ahead as determined by the navigation system 22, the position $X_1, Y_1$ of a part of the vehicle 14a-b immediately ahead as determined by the navigation system 22, a linear single track vehicle model representing the vehicle 14a-b immediately ahead, the height $Z_2$ of the rear automatic coupling device 18, and—in case the vehicle 14a-b immediately ahead is an articulated vehicle—at least one articulation angle φ of the vehicle 14a-b immediately ahead as detected by the articulation angle detection means 28.

The linear vehicle model representing the leading vehicle 14a in FIG. 4 defines so-called equivalent wheelbases $L_{eq1}$, $L_{eq2}$ for the tractor and the semi-trailer of the leading vehicle 14a. Furthermore, the linear vehicle model defines a first coupling position $C_1$ representing a mechanical coupling (typically a fifth wheel/kingpin) between the tractor and the semi-trailer, and a second coupling position $C_2$ representing the rear automatic coupling device 18 of the leading vehicle 14a. Each coupling position $C_x$ is expressed as a linear distance relative to an equivalent wheelbase.

The position $X_2, Y_2$ of the rear automatic coupling device 18 in the XY plane (typically a horizontal plane or a plane parallel to the road surface) in FIG. 4, wherein the articulation angle φ between the the tractor and the semi-trailer of the leading vehicle 14a is zero, is:

$$X_2 = X_1 - (L_{eq1} - C_1 + L_{eq2} + C_2) * \sin \theta_1$$

$$Y_2 = Y_1 - (L_{eq1} - C_1 + L_{eq2} + C_2) * \cos \theta_1$$

The height $Z_2$, typically the vertical position, may for example be estimated based on input from the height level sensor 24 and a predetermined offset between the height level sensor 24 and the rear automatic coupling device 18, see the insert in FIG. 4.

The information 64 sent from the vehicle immediately ahead 14a-b to the following vehicle 14b-c may further include the heading of the rear automatic coupling device 18. The heading of the rear automatic coupling device 18, which here is equal to the heading of the semi-trailer trailer of the leading vehicle 14a, is θ-φ. In FIG. 4, the heading of the rear automatic coupling device 18 is approximately 15 degrees–0 degrees=15 degrees.

Furthermore, each following vehicle 14b-c may estimate the position $X_4, Y_4, Z_4$ of its front coupling element 32 based on the heading $\theta_2$ of the following vehicle 14b-c as determined by the navigation system 34, the position $X_3, Y_3$ of a part of the following vehicle 14b-c as determined by the navigation system 34, a linear single track vehicle model representing the following vehicle 14b-c, a first angle α representing a lateral adjustment of the front coupling device 30, a second angle β representing any vertical adjustment of the front coupling device 30, the length L of the front coupling device 30, and a height H related to the front coupling device 30.

The linear vehicle model representing the following vehicle 14b in FIG. 4 defines a coupling position $C_3$ related to the front coupling device 30, namely the point 46 where the front coupling device 30 is connected on the chassis 44 of the following vehicle 14b. Furthermore, the first angle α is the angle between the front coupling device 30 and the heading of the following vehicle 14a, whereas the second angle β is the angle between the front coupling device 30 and the road surface (the XY plane).

The position $X_4, Y_4$ of the front coupling element 30 in the XY plane in FIG. 4 is:

$$X_4 = X_3 + C_3 * \sin \theta_2 + (L * \cos \beta) * \cos (90 - \theta_2 + \alpha)$$

$$Y_4 = Y_3 - C_3 * \cos \theta_2 + (L * \cos \beta) * \sin (90 - \theta_2 + \alpha)$$

The height $Z_4$ (typically the vertical position) of the front coupling element 32 may be calculated based on a height H of point 46, the length L and the second angle β:

$$Z_4 = H + L * \sin \beta$$

The height H of point 46 may be estimated based on input from the height level sensor 38 and a predetermined offset between the height level sensor 39 and point 46.

As mentioned above, in step S9, the following vehicle 14b-c automatically adjusts its front coupling element 32 so that the position $X_4, Y_4, Z_4$ of the front coupling element 32 matches the position $X_2, Y_2, Z_2$ of the rear automatic coupling device 18 of the vehicle 14a-b immediately ahead. Namely, the front coupling device 30 is adjusted to that the differences dx, dy, dz are removed, for example using a PID (proportional-integral-derivative) controller of each following vehicle 14b-c. The PID controller may be separate (not shown), or it could be incorporated in the control unit 34.

Furthermore, in case the information 64 sent from the vehicle 14a-b immediately ahead to the following vehicle 14b-c includes the heading of the rear automatic coupling device 18 of the vehicle immediately ahead 14a-b, the following vehicle 14b-c may be adapted to judge if the heading is within the operational range 66 of the front coupling element 32 given the possible lateral adjustment α. If not, the present road curvature may be too large for automatic coupling at that moment and speed, or the vehicle 14a-b immediately ahead is not well positioned on the lane for automatic coupling in speed.

It is appreciated that the information 64 in step S7 may be sent continuously, for example from vehicle 14a to vehicle 14b while vehicle 14b drives in step S8 and while it adjusts its front coupling device 30 (step S9), as indicated by the bracket in FIG. 3. Similarly, the positions of the rear automatic coupling device 18 and the front coupling element 32 may be estimated continuously.

In step S10, once the position of the front coupling element 32 matches the position of the rear automatic coupling device 18 of the vehicle immediately ahead 14*a*-*b*, the following vehicle 14*b*-*c* and the vehicle 14*a*-*b* immediately ahead are automatically and mechanically coupled together while in motion to (re-)form at least part of the long vehicle combination 10. That is, the front coupling element 32 is mechanically connected to the rear automatic coupling device 18. As each following vehicle 14*b*-*c* is (re-)coupled, it switches from master to slave. Preferably, the automatic coupling starts with the vehicle 14*b* coupling to the leading vehicle 14*a*. That is, steps S7-S10 may for be performed for vehicles 14*a* and 14*b*, to form a part of the long vehicle combination 10. Then, steps S7-S10 may be performed for vehicles 14*b* and 14*c*, whereby the complete long vehicle combination is formed. There may also be some overlap: step S8 may for example be performed for vehicles 14*b* and 14*c* while steps S9-S10 are performed for vehicle 14*a* and 14*b*. The automatic coupling may be performed while driving at the aforementioned safety speed. The automatic coupling may be performed while driving on a straight road in order to avoid articulation angles in the calculations, like in FIG. 4.

It is to be understood that the present invention is not limited to the embodiments described above and illustrated in the drawings; rather, the skilled person will recognize that many changes and modifications may be made within the scope of the appended claims. For example, the present method may start as the platoon (e.g. step S5), which platoon then transforms into the long vehicle combination, which long vehicle combination then transforms back into the platoon. This may for example be useful in order to receive optimal time slots in e.g. a container shipping port.

The invention claimed is:

1. A method for transforming between a long vehicle combination and a platoon on the move, wherein the long vehicle combination comprises a plurality of vehicles mechanically coupled together one after the other, which method comprises the steps of: detecting that the long vehicle combination is approaching a first road section ahead, which first road section stipulates decoupling the vehicles of the long vehicle combination to form the platoon; automatically decoupling the vehicles from each other while the vehicles are in motion to form the platoon before reaching the first road section; the platoon driving through the first road section; detecting a second road section which stipulates coupling together the vehicles of the platoon to form the long vehicle combination; a vehicle in the platoon immediately ahead of a following vehicle of said the platoon sending information to the following vehicle via wireless vehicle-to-vehicle communication, which information indicates the position and speed of a rear automatic coupling device of the vehicle immediately ahead; based at least on the position and speed indicated in the sent information, autonomously driving the following vehicle so that the rear automatic coupling device of the vehicle immediately ahead of the following vehicle gets within an operational range of a front coupling element of the following vehicle; while in motion and when the rear automatic coupling device is within the operational range, the following vehicle automatically adjusting a front coupling device including said front coupling element so that the position of the front coupling element matches the position of the rear automatic coupling device as indicated in the sent information; and automatically coupling together the following vehicle and the vehicle immediately ahead while the vehicles are in motion to form at least a part of the long vehicle combination.

2. The method according to claim 1, further comprising adjusting the front coupling device with an actuator in the following vehicle.

3. The method according to claim 2, further comprising adjusting the front coupling device laterally with the actuator.

4. The method according to claim 2, further comprising vertically adjusting the front coupling device with the actuator.

5. The method according to claim 1, wherein adjusting the length of the front coupling device of each following vehicle.

6. The method according to claim 5, further comprising the step of: shortening the length of the front coupling device while driving as the long vehicle combination.

7. The method according to claim 1, further comprising: each following vehicle estimating the position of its front coupling element based on the heading of the following vehicle, the position of a part of the following vehicle as determined by a navigation system of the following vehicle, a vehicle model representing the following vehicle, a first angle representing a lateral adjustment of the front coupling device, a second angle representing any vertical adjustment of the front coupling device, the length of the front coupling device, and a height related to the front coupling device.

8. The method according to claim 1, further comprising each vehicle immediately ahead: estimating the position of its rear automatic coupling device based on the heading of the vehicle immediately ahead, the position of a part of the vehicle immediately ahead as determined by a navigation system of the vehicle immediately ahead, a vehicle model representing the vehicle immediately ahead, the height of the rear automatic coupling device, and in case the vehicle immediately ahead is an articulated vehicle, at least one articulation angle of the vehicle immediately ahead as detected by at least one articulation angle detection means on the vehicle immediately ahead.

9. The method according to claim 1, further comprising determining a speed of each vehicle immediately ahead with at least two independent means.

10. The method according to claim 1, further comprising the step of: a leading vehicle of the platoon sending an acceleration or deceleration request to the following vehicles of the platoon via wireless vehicle-to-vehicle communication.

11. The method according to claim 1, wherein the information sent from the vehicle immediately ahead to the following vehicle includes the heading of the rear automatic coupling device of the vehicle immediately ahead.

12. The method according to claim 1, wherein the first road section is at least one of a bridge, a roundabout, and a turn.

13. The method according to claim 1, further comprising the step of planning an inter-vehicle distance between subsequent vehicles based on the first road section ahead, wherein the platoon is driven through the first road section with the planned inter-vehicle distance.

14. The method according to claim 1, wherein at least one of the automatic decoupling and the automatic coupling is performed while driving at a safety speed.

15. The method according to claim 1, wherein the automatic coupling is performed while driving on a straight road.

16. The method according to claim 1, wherein the automatic coupling starts with the vehicle immediately behind the leading vehicle of the platoon coupling to the leading vehicle of the platoon.

17. The method according to claim 1, wherein the automatic decoupling starts with the last vehicle of the long vehicle combination decoupling from the vehicle immediately ahead.

18. The method according to claim 1, wherein each vehicle after the leading vehicle of the long vehicle combination or platoon is an autonomous vehicle.

19. The method according to claim 1, wherein at least one vehicle after the leading vehicle of the long vehicle combination or platoon is an autonomous dolly and semi-trailer combination.

20. A vehicle, characterized in that the vehicle comprises: a rear automatic coupling device; a control unit adapted to estimate the position of the rear automatic coupling device while the vehicle is in motion; and communication means adapted to wirelessly send information indicating the estimated position and the speed of the rear automatic coupling device to a following vehicle.

21. A vehicle, characterized in that the vehicle comprises: a front coupling device including a front coupling element; a control unit adapted to estimate the position of the front coupling element while the vehicle is in motion; communication means adapted to wirelessly receive information from a vehicle immediately ahead, which information indicates the position and speed of a rear automatic coupling device of the vehicle immediately ahead; autonomous driving means adapted to drive the vehicle based at least on the position and speed in the received information so that the rear automatic coupling device of the vehicle immediately ahead gets within an operational range of the front coupling element; and means adapted to automatically adjust the front coupling device, while in motion and when the rear automatic coupling device is within the operational range, so that the position of the front coupling element matches the position of the rear automatic coupling device as indicated in the received information.

* * * * *